J. LUNDGAARD.
MILK PAIL COVER.
APPLICATION FILED MAR. 20, 1912.
1,031,015.
Patented July 2, 1912.
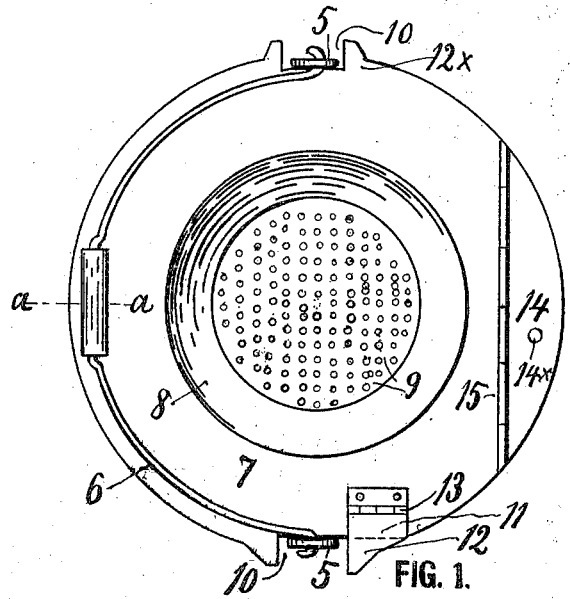
FIG. 1.
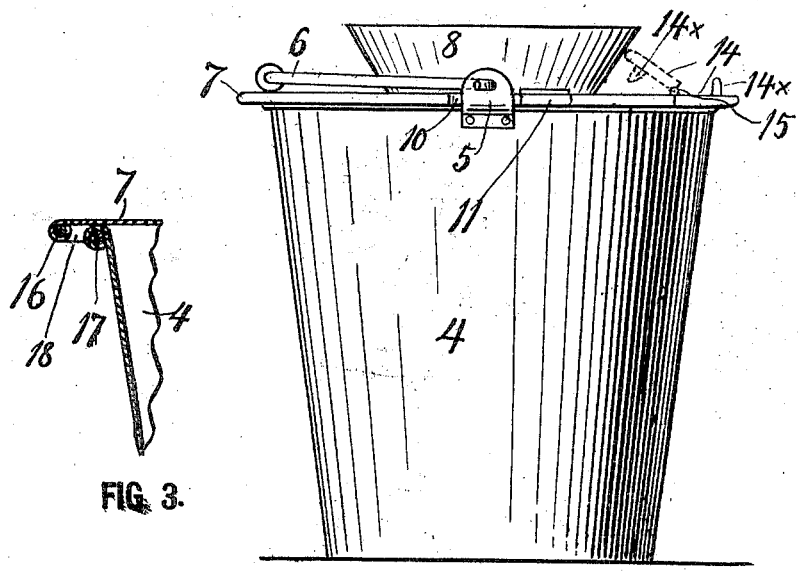
FIG. 3.
FIG. 2.
WITNESSES:
D. E. Carlsen
A. E. Carlsen
INVENTOR:
John Lundgaard,
BY his ATTORNEY:
A. M. Carlsen

UNITED STATES PATENT OFFICE.

JOHN LUNDGAARD, OF ST. PAUL, MINNESOTA.

MILK-PAIL COVER.

1,031,015.  Specification of Letters Patent.  Patented July 2, 1912.

Application filed March 20, 1912. Serial No. 685,110.

*To all whom it may concern:*

Be it known that I, JOHN LUNDGAARD, a citizen of the United States, residing at St. Paul, in the county of Ramsey and State of Minnesota, have invented a new and useful Milk-Pail Cover, of which the following is a specification.

My invention relates to sanitary milk pail covers, and the object is to provide a milk pail cover which will fit several sizes of ordinary milk pails, and through which the milk will be strained while passing into the pail and may then be poured out of the pail without removal of the cover and without the expense of providing the pail with a spout.

In the accompanying drawing,—Figure 1 is a top view of a milk pail provided with my improved cover. Fig. 2 is a side elevation of the pail and cover shown in Fig. 1. Fig. 3 is an enlarged sectional view on the line $a$—$a$ Fig. 1.

Referring to the drawing by reference numerals, 4 designates an ordinary milk pail having ears 5 with a bail 6 therein. Said pail I provide with a cover 7, which may be plane, or it may be bulged upward some toward the middle.

Upon the middle of the cover is provided an annular guard 8, within which the cover is perforated as at 9 to form a strainer; or, the cover may have a large central opening with a strainer fixed therein; or, the guard 8 may have a strainer for its bottom over the opening in the cover.

The cover is provided with two diametrically opposite notches, 10 for the ears 5 of the pail to engage in and aid in keeping the cover in central position on the pail. One of said notches is open not only outward but also laterally as indicated at 11; said lateral opening is closed by a flap 12 which is hinged at 13 to the cover.

Between the notches 5 an edge portion 14 of the cover forms a lid that is hinged at 15, so it may fold upward and backward, as shown in dotted lines in Fig. 2, until a stud $14^x$ touches the main cover and holds the lid in such a position that it may readily be taken hold of again in closing it.

The edges of the cover are stiffened by an inlaid wire 16, shown in Fig. 3, similar to the wire 17 in the edge of the pail. At 18 in said Fig. 3 is indicated that, when as a matter of economy the same cover is used on pails of different sizes, the pails will extend more or less outward under the cover, and as this will bring the pail ears of the smaller sized pails quite close to the bottom of the notches 10, the flap 12 must be raised in placing the cover on the pail and in removing it therefrom. The flap also facilitates the removal and replacing of the cover on larger pails; and for the smallest size of milk pails it will be well to have a similar flap at $12^x$ in Fig. 1.

In the use of the device, the cover is placed on the pail and the milking is done into the strainer guard 8, the milk is thus strained while passing into the pail, and when the milk is to be poured out the lid 14 is raised and the pail leaned over so the milk will run out at the opening normally closed by the lid.

Milk from other vessels may also be strained by pouring it down through the strainer 9 and then out of the pail 4, but the main object is to keep the milk covered from germs, dust and dirt during the process of milking and as long as possible thereafter.

What I claim is:—

1. A milk pail cover having a central strainer with a guard about it and two diametrically opposite notches for the ears of the milk pail, one of said notches having at one side a hinged flap adapted to be raised in placing or removing the cover.

2. A milk pail cover having a central strainer with a guard about it and two diametrically opposite notches for the ears of the milk pail, and between said notches a hinged portion adapted to be raised in pouring out milk from the pail.

3. A milk pail cover having a central strainer with a guard about it and two diametrically opposite notches for the ears of the milk pail, said cover adapted to rest upon a pail and project more or less beyond the same according to the size of the pail.

In testimony whereof I affix my signature, in presence of two witnesses.

JOHN LUNDGAARD.

Witnesses:
A. M. CARLSEN,
THEODORE SANDER.